United States Patent
Kuechler et al.

(10) Patent No.: US 9,714,620 B2
(45) Date of Patent: Jul. 25, 2017

(54) METHODS AND SYSTEMS FOR IMPROVING BOOST RESPONSE

(71) Applicant: Ford Global Technologies, LLC, Dearborn, MI (US)

(72) Inventors: Peter Douglas Kuechler, Canton, MI (US); Dev Saberwal, Canton, MI (US); Kevan Bates, Troy, MI (US); Trevor Losch, Plymouth, MI (US); Justin Lesniak, Bay City, MI (US); Michael M. S. Simon, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/928,965

(22) Filed: Oct. 30, 2015

(65) Prior Publication Data

US 2017/0122234 A1    May 4, 2017

(51) Int. Cl.
    *F02D 41/12*    (2006.01)
    *F02D 41/00*    (2006.01)
    *F02D 17/02*    (2006.01)
    *F01N 3/20*     (2006.01)

(52) U.S. Cl.
    CPC ....... *F02D 41/0087* (2013.01); *F01N 3/2006* (2013.01); *F02D 17/02* (2013.01)

(58) Field of Classification Search
    CPC ............. F02D 41/0087; F02D 41/0005; F02D 41/0007; F02D 41/045; F02D 41/12; F02D 41/123; F02D 17/02; F02D 2009/0222; F01N 3/2006
    USPC ....... 123/320, 399, 325, 328, 332, 676, 679, 123/682, 481, 493, 559.1, 564; 701/103, 701/110, 112; 60/598, 599, 600, 601, 60/602, 603
    See application file for complete search history.

(56) References Cited

U.S. PATENT DOCUMENTS

| | | | |
|---|---|---|---|
| 8,126,632 B2 | 2/2012 | Pallett et al. | |
| 8,355,858 B2 | 1/2013 | Pallett et al. | |
| 8,682,566 B2 | 3/2014 | Pallett et al. | |
| 8,961,368 B2 | 2/2015 | Glugla | |
| 2014/0100758 A1 | 4/2014 | Glugla et al. | |
| 2014/0109568 A1 | 4/2014 | Glugla et al. | |
| 2016/0222898 A1* | 8/2016 | Ulrey | F02D 41/0087 |

* cited by examiner

*Primary Examiner* — Hai Huynh
(74) *Attorney, Agent, or Firm* — Julia Voutyras; McCoy Russell LLP

(57) ABSTRACT

Methods and systems are provided for improving boost response in a turbocharged engine. In one example, a method may include in response to a tip-out following a tip-in, when an exhaust catalyst temperature is within a threshold range, deactivating fuel injectors to the engine and increasing air flow to an exhaust turbine based on a desired increase in a turbine speed to maintain the turbine speed at or above a threshold speed.

20 Claims, 5 Drawing Sheets

METHODS AND SYSTEMS FOR IMPROVING BOOST RESPONSE

FIELD

The present description relates generally to methods and systems for controlling a vehicle engine to reduce turbo lag in internal combustion engines having at least one turbocharger.

BACKGROUND/SUMMARY

Turbo charging an engine allows the engine to provide power similar to that of a larger displacement engine while engine pumping work is maintained near the pumping work of a normally aspirated engine of similar displacement. Thus, turbo charging can extend the operating region of an engine. Turbocharged engines utilize a turbocharger to compress intake air and increase the power output of the engine. A turbocharger may use an exhaust-driven turbine to drive a compressor which compresses intake air. As the speed of the compressor increases, more boost is provided to the engine. However, during certain vehicle launch conditions, such as when accelerating from idle, due to minimal exhaust gas flow combined with increased load on the compressor, it may take an amount of time for the turbine and compressor to speed up and provide the required boost. This delay in turbocharger response, termed turbo lag, may result in a delay in providing the demanded engine power.

One example approach to reducing turbo lag is shown by Pallett et al. in U.S. Pat. No. 8,355,858. Therein, during deceleration and/or idle conditions when a driver tip-in is imminent, a first and second fuel injection amount is utilized, where the first amount produces a lean combustion and sufficient torque to maintain engine speed, while the second injection injected after the lean combustion provides additional exhaust reductant to match excess air of combustion, and generate sufficient exhaust energy to maintain the turbocharger speed at a target speed.

However, the inventors herein have identified potential issues with such approaches. As one example, since such operations to reduce turbo lag are performed only when driver tip-in is imminent, turbine speed is allowed to decrease significantly during the deceleration and hence, energy to increase turbine speed is greater. Thus, fuel injection is required to provide the extra exhaust energy to spin-up the turbine, which increases fuel usage and degrade fuel economy. Further, while the overall air-fuel ratio may be maintained at stoichiometry with the second injection, the unburned fuel in the exhaust may react with the exhaust catalyst and increase a temperature of the exhaust catalyst, thereby increasing a risk of thermal degradation of the exhaust catalyst. Still further, in order to control engine speed while increasing turbine speed, it may be required to limit the power generated during combustion by air flow adjustments and/or spark retard, for example, which may degrade engine efficiency in addition to degrading fuel economy.

Thus, in one example, some of the above issues may be at least partially addressed by a method for a boosted engine, comprising: in response to a deceleration event, deactivating fuel injectors to all cylinders of the engine while increasing airflow through a turbine of a turbocharger when a temperature of an exhaust catalyst downstream of the turbine is between a upper threshold and a lower threshold. In this way, by increasing air flow to the turbine during selected deceleration conditions, boost response during a subsequent tip-in may be improved.

As one example, in response to a tip-out that occurs after a long and large tip-in, when the tip-out conditions favor a deceleration fuel shut-off event and if an exhaust catalyst temperature is within a threshold range, fuel injectors to all cylinders of the engine may be deactivated. Simultaneously, airflow through a turbine may be increased (e.g., by opening an air intake throttle, closing wastegate, etc.), resulting in increased turbine speed. Further, airflow through the turbine may be adjusted so as to maintain the turbine speed above a threshold speed. Thus, during the tip-out, due to increased airflow to the turbine, turbine speed is not allowed to drop below the threshold. By maintaining turbine speed above the threshold, time taken to spool up the turbine to a desired speed during a subsequent tip-in is reduced. Consequently, turbo lag is reduced and boost response is improved.

Further, air flow through the turbine may be increased only when the tip-out occurs after a long and/or large tip-in. Thus, the turbine speed at the start of deceleration fuel shut-off is sufficient to enable faster increase of turbine speed above the threshold with reduced actuator adjustments. Further, by increasing air flow only when the fuel injectors are deactivated, measures to limit power generated during combustion (e.g., spark retard) may not be utilized, which improves fuel economy and engine braking efficiency. Still further, by increasing air flow during deceleration fuel shut-off conditions only when the exhaust catalyst temperature is within a threshold range, exhaust catalyst efficiency may be improved and thermal damage due to excess exhaust heat may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
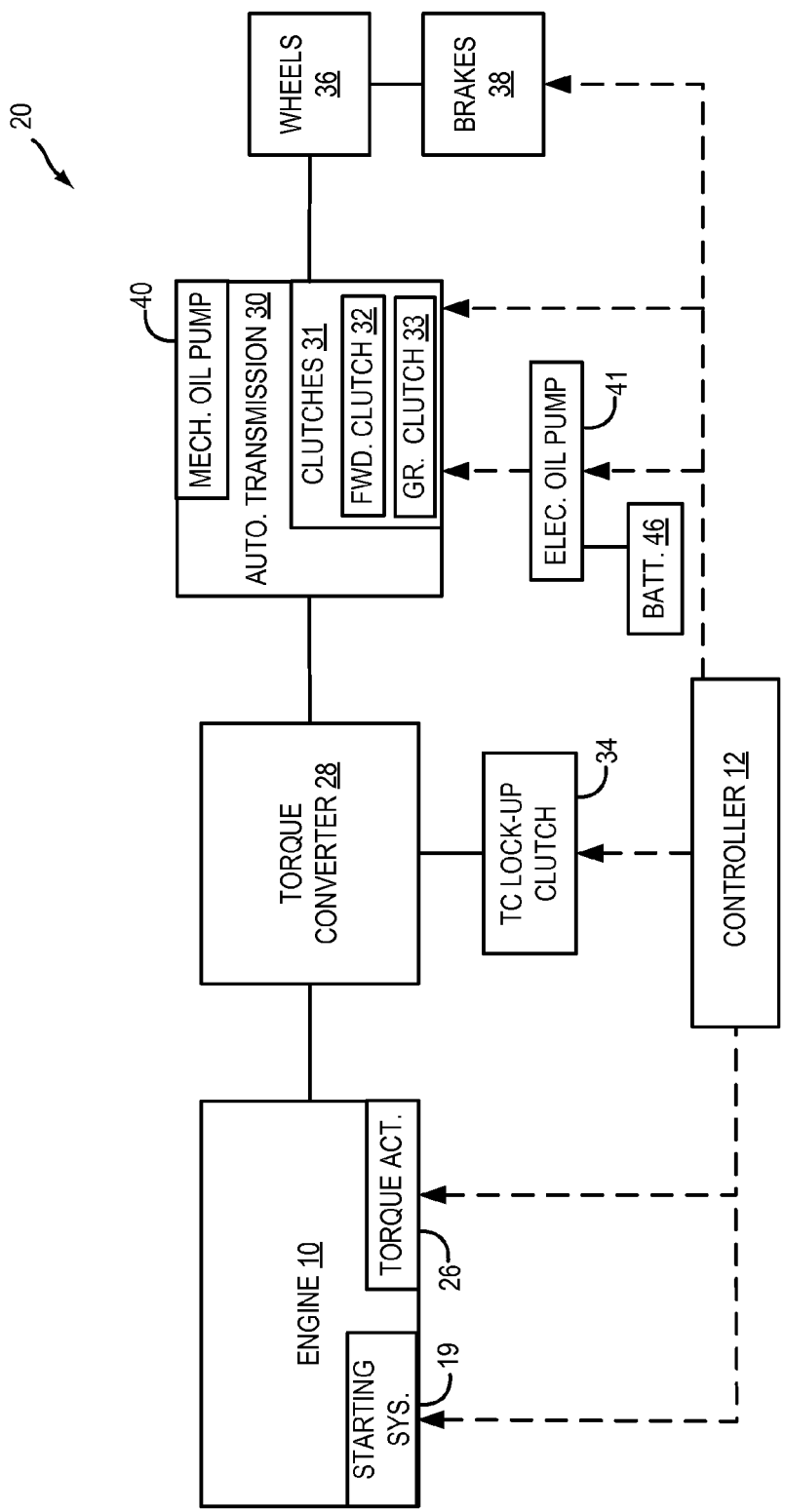
FIG. 1 is a block diagram of a vehicle drive-train.
Figure 2:
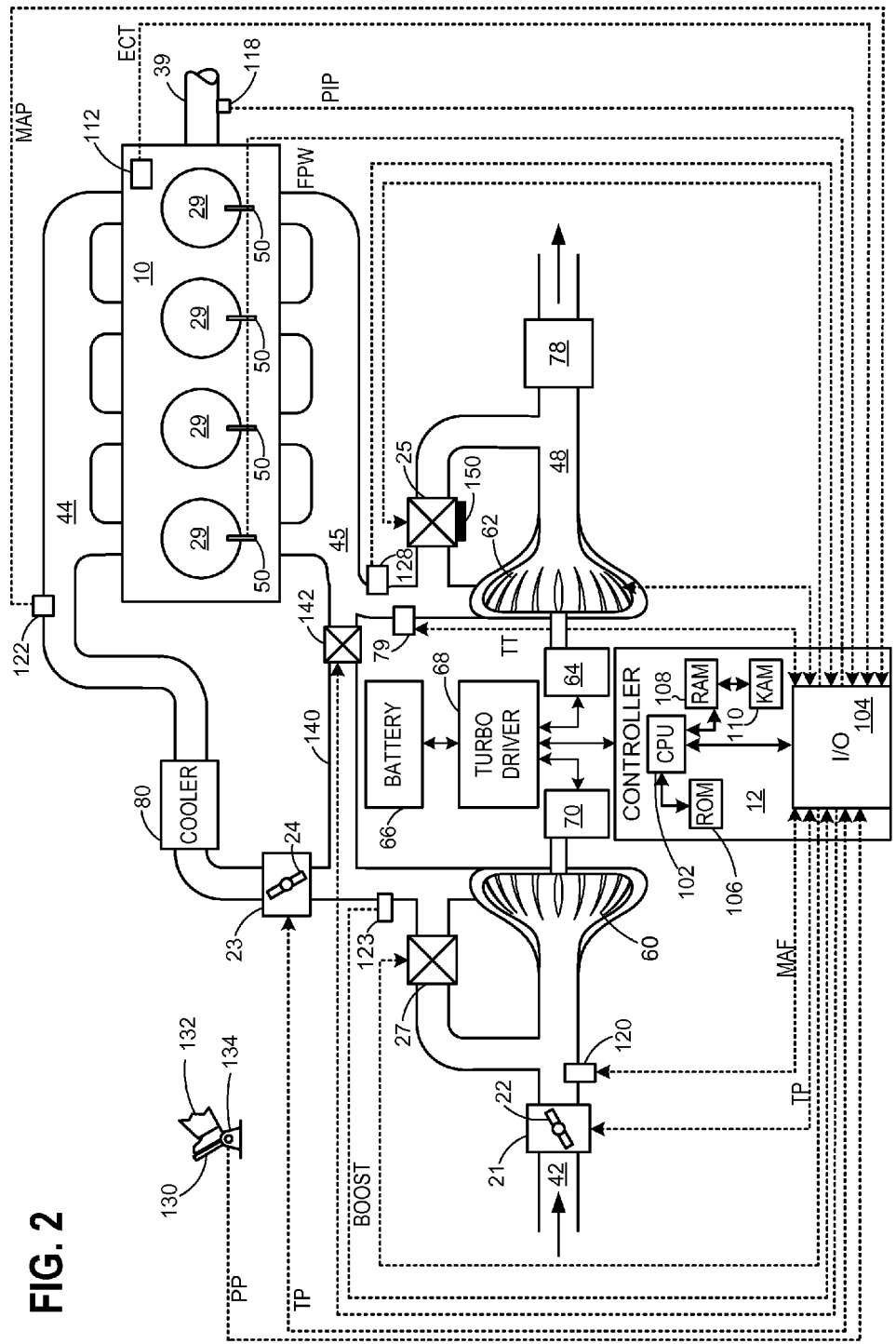
FIG. 2 is a schematic diagram showing aspects of the engine of FIG. 1.

The following description relates to systems and methods for improving boost response in a turbocharged engine system, such as the engine system of FIG. 2 powering a vehicle drive-train, such as the drive train of FIG. 1. A controller may be configured to perform a control routine, such as the example routine of FIG. 3, to increase air flow through an exhaust turbine of the turbocharged engine in order to increase and maintain turbine speed at or above a threshold speed during selected deceleration conditions. The selected deceleration conditions may include deceleration fuel shut-off conditions, where the deceleration occurs subsequent to a high accelerator pedal input condition (tip-in greater than a threshold), and when an exhaust catalyst temperature is within a threshold range. Air flow through the turbine may be adjusted according to the example routine of FIG. 4 by adjusting one or more actuators of the engine system. An example adjustment of air flow through the turbine according to the present disclosure during vehicle operation is shown at FIG. 5.

FIG. 1 is a block diagram of a vehicle drive-train 20. Drive-train 20 may be powered by engine 10. Engine 10 may be started with an engine starting system 19 including a motor-driven starter, for example. The starter motor may be operated using current from battery 46, for example. Further, engine 10 may generate or adjust torque via torque actuator 26, such as a fuel injector, throttle, etc.

An engine output torque may be transmitted to torque converter 28 to drive an automatic transmission 30. Further, one or more clutches 31 may be engaged, including forward clutch 32, to propel a vehicle. In one example, the torque converter 28 may be referred to as a component of the transmission 30. Transmission 30 may include a plurality of gear clutches 33 that may be engaged as needed to activate a plurality of fixed transmission gear ratios. Specifically, by adjusting the engagement of the plurality of gear clutches 33, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. A controller may vary the transmission gear (e.g., upshift or downshift the transmission gear) to adjust an amount of torque conveyed across the transmission and torque converter to vehicle wheels 36 (that is, an engine shaft output torque).

The output of the torque converter may be controlled by torque converter lock-up clutch 34. For example, when torque converter lock-up clutch 34 is fully disengaged, torque converter 28 transmits engine torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter clutch to an input shaft (not shown) of transmission 30. Alternatively, the torque converter lock-up clutch 34 may be partially engaged, thereby enabling the amount of torque relayed to the transmission to be adjusted.

A controller 12 may be configured to adjust the amount of torque transmitted by torque converter 28 by adjusting the torque converter lock-up clutch in response to various engine operating conditions, or based on a driver-based engine operation request. In one example, an engine operation request may be received from the vehicle operator via an accelerator pedal and/or a brake pedal (shown in FIG. 2). Torque output from the automatic transmission 30 may in turn be relayed to wheels 36 to propel the vehicle. Specifically, automatic transmission 30 may transfer an input driving torque at the input shaft (not shown) responsive to a vehicle traveling condition before transmitting an output driving torque to the wheels.

Further, a frictional force may be applied to wheels 36 by engaging wheel brakes 38. In one example, wheel brakes 38 may be engaged in response to the driver pressing his foot on a brake pedal. In the same way, a frictional force may be reduced to wheels 36 by disengaging wheel brakes 38 in response to the driver releasing his foot from the brake pedal. Further, vehicle brakes may apply a frictional force to wheels 36 as part of an automated engine stopping procedure. In some examples, the transmission may be tied-up to a transmission housing to assist the vehicle brakes in holding the vehicle stationary.

A mechanical oil pump 40 may be in fluid communication with automatic transmission 30 to provide hydraulic pressure to engage the various clutches 31, such as forward clutch 32, gear clutches 33, and/or torque converter lock-up clutch 34. Mechanical oil pump 40 may be operated in accordance with torque converter 28, and may be driven by the rotation of the engine or transmission input shaft, for example. Thus, the hydraulic pressure generated in mechanical oil pump 40 may increase as an engine speed increases, and may decrease as an engine speed decreases. An electric oil pump 41, also in fluid communication with the automatic transmission but operating independent from the driving force of engine 10 or transmission 30, may be provided to supplement the hydraulic pressure of the mechanical oil pump 40. Electric oil pump 41 may be driven by an electric motor (not shown) to which an electric power may be supplied, for example by battery 46.

Controller 12 may be configured to receive inputs from engine 10, as shown in more detail in FIG. 2, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. Engine control may be performed on a cylinder-by-cylinder basis to control the engine torque output (e.g., in all cases). Controller 12 may stipulate a shift and set the transmission shift request flag based on various engine and vehicle operating parameters, including but not limited to the current transmission gear, engine speed, and accelerator pedal position—for example, threshold changes in the accelerator pedal position in a suitable duration may prompt a shift.

FIG. 2 is a schematic diagram showing aspects of engine 10 of FIG. 1. The engine 10 is shown with four cylinders 29. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 29 of engine 10 may include combustion chamber walls with a piston (not shown) positioned therein. The pistons may be coupled to a crankshaft 39 so that reciprocating motion of the piston is translated into rotational motion of the crankshaft. Crankshaft 39 may be coupled to at least one drive wheel of a vehicle via transmission 30, for example. Further, a starter motor may be coupled to crankshaft 39 via a flywheel to enable a starting operation of engine 10.

Combustion chambers 29 may receive intake air from intake manifold 44 via intake passage 42 and may exhaust combustion gasses via exhaust passage 48. Intake manifold 44 and exhaust manifold 45 can selectively communicate with combustion chamber 29 via respective intake valves and exhaust valves (not shown). In some embodiments, combustion chamber 29 may include two or more intake valves and/or two or more exhaust valves.

Fuel injectors 50 are shown coupled directly to combustion chamber 29 for injecting fuel directly therein in proportion to the pulse width of signal FPW received from controller 12. In this manner, fuel injector 50 provides what is known as direct injection of fuel into combustion chamber 29. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 29 may alternatively, or additionally, include a fuel injector arranged in intake manifold 44 in a configuration that provides what is known as port injection of fuel into the intake port upstream from each combustion chamber 29.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 29 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

In one example, as described below, during tip-out conditions, instead of maintaining closed throttle conditions, air flow to turbine 48 may be increased by opening throttle 21 and 23. By increasing air flow to the turbine, a turbine speed may be maintained at or above a threshold during deceleration conditions so that during a subsequent tip-in, a duration to increase the turbine speed to a desired speed is reduced, thereby improving boost response. Further, air flow to the turbine may be increased only when the deceleration conditions favor a fuel shut-off event. Consequently, measures to reduce combustion power (e.g., spark retard) may not be required. Still further, air flow to the turbine may be increased only as long as the exhaust catalyst temperature is within a threshold range in order to reduce emissions and reduce thermal degradation of the catalyst. Details of increasing air flow to the turbine according to the present disclosure will be further elaborated with respect to FIGS. 3-5.

Exhaust passage 48 may receive exhaust gasses from cylinders 29. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof. While not shown in FIG. 2, it will be appreciated that a similarly-configured intake air sensor may be included in engine 10 (e.g., coupled to intake passage 42) to enable sensing of intake gas AFR. As with exhaust gas sensor 128, the intake air sensor may be any suitable sensor for providing an indication of intake gas AFR such as a linear oxygen sensor or UEGO, a two-state oxygen sensor or EGO, a HEGO, a $NO_x$, HC, or CO sensor, for example Exhaust temperature may be measured by one or more temperature sensors (not shown) located in exhaust passage 48. Alternatively, exhaust temperature may be inferred based on engine operating conditions such as speed, load, AFR, spark retard, etc.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 39; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 39. In some examples, storage medium read-only memory 106 may be programmed with computer readable data representing instructions executable by processor 102 for performing the methods described below as well as other variants that are anticipated but not specifically listed. The controller 12 receives signals from the various sensors of FIG. 1 and FIG. 2 and employs the various actuators of FIG. 1 and FIG. 2 to adjust engine operation based on the received signals and instructions stored on a memory of the controller.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing there through. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 25 for diverting exhaust gas away from turbine 62. In some embodiments, wastegate 25 may be a multi-staged wastegate, such as a two-staged wastegate with a first stage configured to control boost pressure and a second stage configured to increase heat flux to emission control device 78. Wastegate 25 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 25 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gasses. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust O$_2$ sensor and/or an intake oxygen sensor (intake manifold). Under some conditions, the EGR system may be used to regulate the temperature of the air and fuel mixture within the combustion chamber. FIG. 2 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

In one example, the systems of FIGS. 1, and 2 may enable a system for a turbocharged engine system, comprising: an engine including an intake manifold and an exhaust manifold; a compressor coupled to the intake manifold and driven by a turbine coupled to the exhaust manifold; an air intake throttle positioned within an intake passage upstream of a compressor, the intake passage coupling the compressor with ambient air; an exhaust catalyst coupled within an exhaust passage downstream of the turbine, the exhaust passage coupling the catalyst with ambient air; one or more fuel injectors supplying fuel to the engine; an accelerator pedal for receiving an operator torque request; and a controller having executable instructions stored in a non-transitory memory for: in response to an accelerator pedal tip-out event initiated subsequent to a tip-in event, deactivating all fuel injectors; and during a first condition, flowing air from the ambient to the turbine via the compressor and the engine while maintaining deactivation of the fuel injectors; during a second condition, flowing air from the ambient to the turbine via the engine by passing the compressor while maintaining deactivation of the fuel injectors; and during a third condition, stopping flowing air to the turbine while maintaining deactivation of the fuel injectors; and wherein the first condition includes an exhaust catalyst temperature between a lower threshold and a first upper threshold; wherein the second condition includes the exhaust catalyst temperature at or above the first upper threshold and below a second upper threshold, the second upper threshold greater than the first upper threshold; and wherein the third condition includes the exhaust catalyst temperature at or above the second upper threshold. The system further includes wherein flowing air to the turbine includes increasing an opening of the air intake throttle based on a desired turbine speed. The system further includes wherein the controller includes further instructions for: in response to application of the accelerator pedal subsequent to the tip-out, activating one or more fuel injectors and adjusting flow through the turbine based on an operator torque demand.

Figure 3:
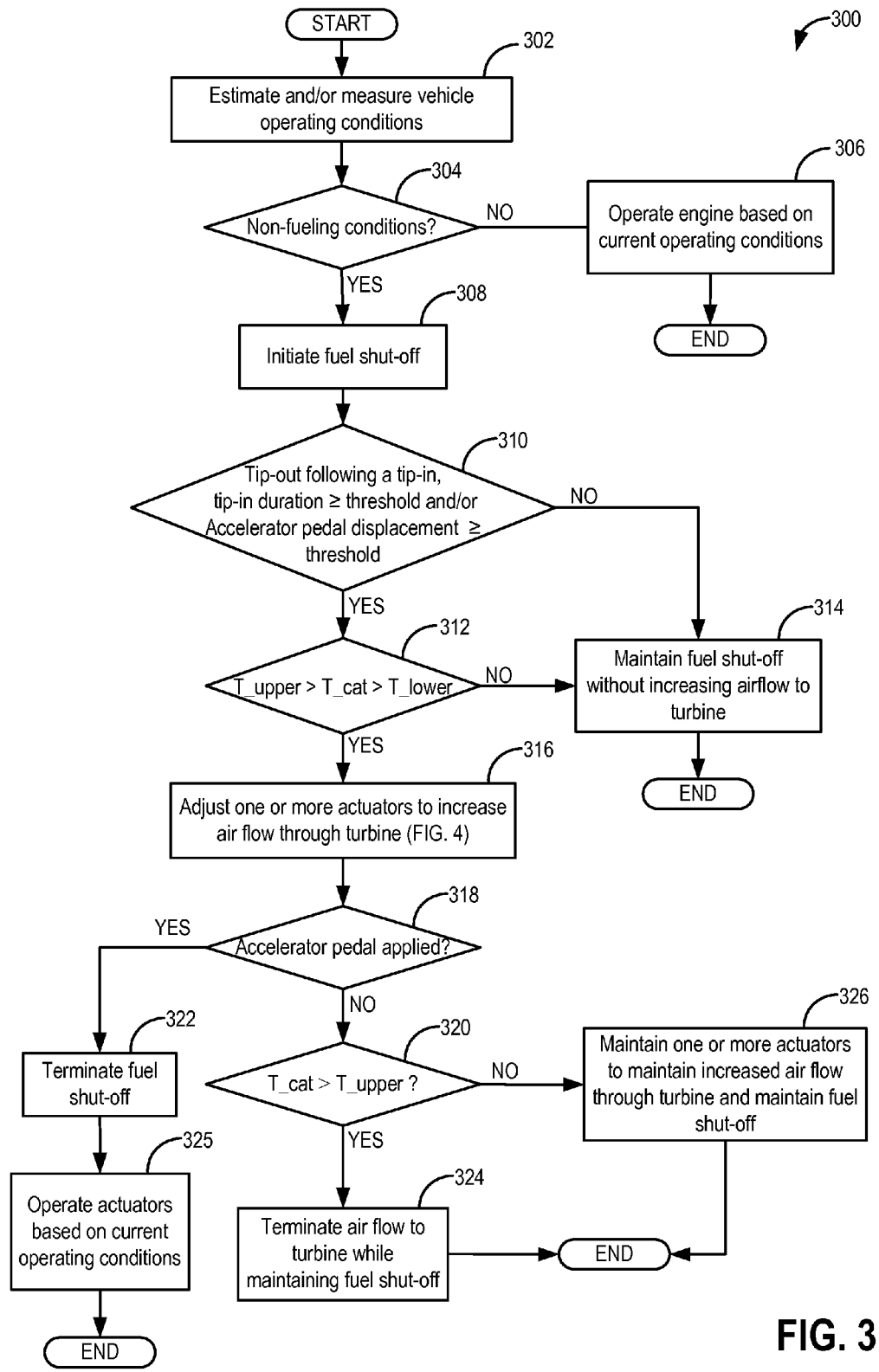
FIG. 3 shows a flow chart illustrating an example method for adjusting air flow through a turbine of a turbocharger during selected deceleration conditions.

FIG. 3 shows a flowchart illustrating an example method 300 for reducing turbo-lag in a boosted engine. Specifically, method 300 includes increasing air flow through an exhaust turbine of the boosted engine during selected deceleration fuel shut-off conditions to improve boost response for a subsequent tip-in. Method 300 will be described herein with reference to the components and systems depicted in FIGS. 1-2, though it should be understood that the method may be applied to other systems without departing from the scope of this disclosure. Instructions for carrying out method 300 and the rest of the methods included herein may be executed by a controller, such as controller 12 at FIGS. 1-2, based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, method 300 includes estimating and/or measuring engine operating conditions. These may include, for example, exhaust catalyst temperature, engine speed and load, driver torque demand (based on accelerator pedal position), MAP, MAF, BP, engine temperature, EGR amount, air-fuel ratio, boost, etc. Based on engine operating conditions and torque demand, the vehicle controller may adjust one or more engine actuator settings. The actuator settings adjusted may include, for example, variable cam timing (VCT), AFR, throttle opening, spark timing, etc.

At 304, method 300 includes determining whether the engine is operating under non-fueling conditions. Non-fueling conditions may include engine operating conditions in which fuel supply is interrupted but the engine continues spinning and at least one intake valve and one exhaust valve are operating; thus, air is flowing through one or more of the cylinders, but fuel is not injected in the cylinders. Under non-fueling conditions, combustion is not carried out and ambient air may move through the cylinder from the intake passage to the exhaust passage. Non-fueling conditions may include, for example, deceleration fuel shut off (DFSO). DFSO may be responsive to an accelerator pedal, and may occur repeatedly during a drive cycle. Accordingly, in one example, the method may include determining whether engine operating conditions are suitable for initiating DFSO. During DFSO, the engine may be operated without fuel injection while rotating and pumping air through the cylinders. In some examples, one or more of vehicle speed, vehicle acceleration, engine speed, engine load, throttle position, pedal position, transmission gear position, and various other parameters may be used to determine whether DFSO is to be initiated. In one example, DFSO may be initiated if engine speed is below a threshold speed. In another example, DFSO may be initiated if engine load is below a threshold. In still another example, DFSO may be initiated based on an accelerator pedal position and/or a change in the accelerator pedal position for a suitable duration—e.g., DFSO may be initiated if a threshold change in the accelerator position indicating driver tip-out has occurred. Additionally or alternatively, DFSO may be initiated if the vehicle has remained in tip-out conditions (e.g., accelerator pedal released) for a threshold duration. Further, additionally or alternatively, entry into DFSO may be determined based on a commanded signal to cease fuel injection.

If non-fueling conditions are not confirmed (that is, if answer at 304 is NO), method 300 proceeds to 306. At 306, method 300 includes operating the engine based on current operating conditions. For example, one or more engine actuator settings, such as VCT, AFR, throttle opening, spark timing, etc. may be adjusted based on current engine operating conditions and torque demand. The method may then end.

If non-fueling conditions are confirmed (that is, if answer at 304 is YES), method 300 proceeds to 308. At 308, method 300 includes initiating fuel shut-off. For example, fuel shut-off may be initiated by ceasing fuel injection to the engine. That is, fuel injection may be stopped for all cylinders. For example, the controller may control the operation of one or more fuel injectors (such as fuel injectors 50 shown at FIG. 2) via one or more fuel injector actuators. In order to deactivate one or more fuel injectors, the controller may stop voltage to the one or more fuel injector actuators. Additionally, in some examples, spark ignition may be ceased for spark-ignited engines.

Upon initiating fuel shut-off, method 300 proceeds to 310. At 310, method 300 includes determining if a tip-out to closed accelerator pedal conditions has occurred; and further includes determining if the tip-out has occurred after a tip-in, where a duration of the tip-in is greater than a threshold duration and/or an accelerator pedal displacement (that is, accelerator pedal depression) during the tip-in is greater than a threshold displacement. In other words, it may be determined if the vehicle operator has been operating at a high accelerator pedal input (the accelerator pedal input proportional to on accelerator pedal depression) above a threshold input and then has changed to zero accelerator pedal input (tip-out). Additionally or alternatively, it may be determined if the vehicle operator has been operating with an accelerator pedal input greater than zero for a duration greater than the threshold duration and then has changed to zero accelerator pedal input.

If the answer at 310 is NO, method 300 proceeds to 314. At 314, method 300 includes maintaining fuel shut-off without increasing air flow to the turbine. That is, during the tip-out conditions (accelerator pedal is released), an air intake throttle may be closed.

If the answer at 310 is YES, method 300 proceeds to 312. At 312, method 300 includes determining if an exhaust catalyst temperature (T_cat) is within a threshold range. For example, it may be determined if the exhaust catalyst temperature is above a lower temperature threshold (T_lower) and below an upper temperature threshold (T_upper). In one example, the lower catalyst temperature may be a catalyst light-off temperature; and the upper catalyst temperature may be maximum temperature above which catalyst damage may occur. In another example, the lower catalyst temperature may be greater than the catalyst light-off temperature and the upper catalyst temperature may be lower than the maximum catalyst temperature, wherein the lower temperature is less than the upper catalyst temperature.

If it is confirmed at 312 that the exhaust catalyst temperature is not within the threshold range (answer at 312 is NO), the method proceeds to 314 to maintain fuel shut-off without increasing air flow to the turbine.

If it is confirmed at 312 that the exhaust catalyst temperature is within the threshold range (answer at 312 is YES), method 300 proceeds to 316. At 316, method 300 includes adjusting one or more actuators to increase air flow through an exhaust turbine while maintaining fuel shut-off. For example, the controller may command a throttle actuator to increase an opening of the air intake throttle to increase air flow through the turbine while maintaining deactivation of the fuel injectors. By increasing air flow through the turbine, turbine speed may be increased and maintained above a threshold speed so that during a subsequent tip-in, a duration to increase the turbine speed is reduced. Consequently turbo lag is reduced and boost response is improved. Details of adjusting the one or more actuators to increase air flow to the turbine will be further elaborated with respect to FIG. 4. For example, air flow through the engine may be increased by performing one or more operations including adjusting a throttle position via a throttle actuator, adjusting a turbocharger waste gate position via a wastegate actuator, and adjusting a variable camshaft timing via a variable camshaft timing actuator. While the present example illustrates increasing air flow after initiating fuel shut-off, in some examples, upon confirming fuel shut-off conditions (as discussed at 304), tip-out conditions (as discussed at 310), and catalyst temperature conditions (as discussed at 312), the fuel shut-off operation and increasing air flow through turbine may be performed simultaneously.

Upon increasing air flow through turbine, method proceeds to 318. At 318, method 300 includes determining if the accelerator pedal is applied. For example, it may be determined if an accelerator pedal input is received by the controller in response to the vehicle operator depressing the accelerator pedal. If it is confirmed that the accelerator pedal is applied, method 300 proceeds to 322. At 322, method 300 includes terminating fuel shut-off in response to confirming accelerator pedal input. For example, the vehicle operator may request torque by applying the accelerator pedal, in response to which fuel injection may be activated (e.g., by applying voltage to the fuel injector actuator) in order to initiate combustion to provide requested torque.

Next, method 300 proceeds to 325. At 325, method 300 includes adjusting one or more actuators based on current operating conditions to adjust air flow through the engine to provide operator demanded torque. For example, an opening of the intake throttle may be adjusted based on current accelerator pedal position. Adjusting one or more actuators may further include adjusting a waste gate position, a variable cam timing, transmission gear position, a compressor bypass valve position, and an EGR valve position based on current operating conditions which include engine speed, load, torque demand (based on current accelerator pedal position, etc.).

Returning to 318, if the accelerator pedal is not applied, the method proceeds to 320. That is, if the vehicle operator has not requested torque (tip-out conditions), method 300 proceeds to 320. At 320, method 300 includes determining if the exhaust catalyst temperature has increased above the upper threshold. For example, during tip-out conditions, the air pumped through the turbine flows into the exhaust which may increase the exhaust catalyst temperature. If the exhaust catalyst temperature increases above the upper threshold, air flow through the turbine may be terminated in order to reduce thermal damage to the exhaust catalyst. Accordingly, if it is confirmed that the exhaust catalyst temperature has increased above the upper threshold (answer at 320 is YES), method 300 proceeds to 324. At 324, method 300 includes terminating air flow to turbine while maintaining fuel shut-off. By stopping air flow to the turbine, air flow to the exhaust catalyst may be reduced, thereby preventing excess increase in exhaust catalyst temperature. Air flow to the turbine may be stopped by adjusting the air intake throttle to a closed position (that is the intake throttle may be adjusted based on accelerator pedal position). In some examples, stopping air flow to the turbine may further include opening a wastegate to bypass the turbine. In other examples, stopping air flow to the turbine may additionally include opening a low pressure EGR valve coupled within a low pressure EGR passage upstream of the catalyst so that a portion air from the exhaust passage is diverted away from the exhaust catalyst.

Returning to 320, if the exhaust temperature is not at or above the upper threshold (that is, answer at 320 is NO), method 300 proceeds to 326. At 326, method 300 includes continuing air flow through the turbine. For example, the one or more actuators may be adjusted, as discussed at FIG. 4, to maintain increased air flow through turbine. The amount of air flow may be based on a threshold turbine speed. Specifically, the amount of air flow is based on a flow required to maintain the turbine speed above threshold speed. In one example, one or more of a throttle position, a waste gate position, a variable cam timing, transmission gear position, a compressor bypass valve position, and an EGR valve position may be adjusted in order to maintain a turbine speed above a threshold.

In this way, in response to a tip-out following a tip-in that is longer than a threshold duration and/or larger than a threshold displacement, and when operating in fuel shut-off conditions with exhaust catalyst temperature within a threshold range, air flow through an exhaust turbine may be increased for a duration of tip-out until the accelerator pedal is applied or the exhaust catalyst increases above an upper threshold. By increasing air flow through the turbine, turbine speed may be maintained above a threshold speed during the tip-out conditions. As a result, during a subsequent tip-in, the desired boost response may be achieved with reduced turbo lag.

Figure 4:
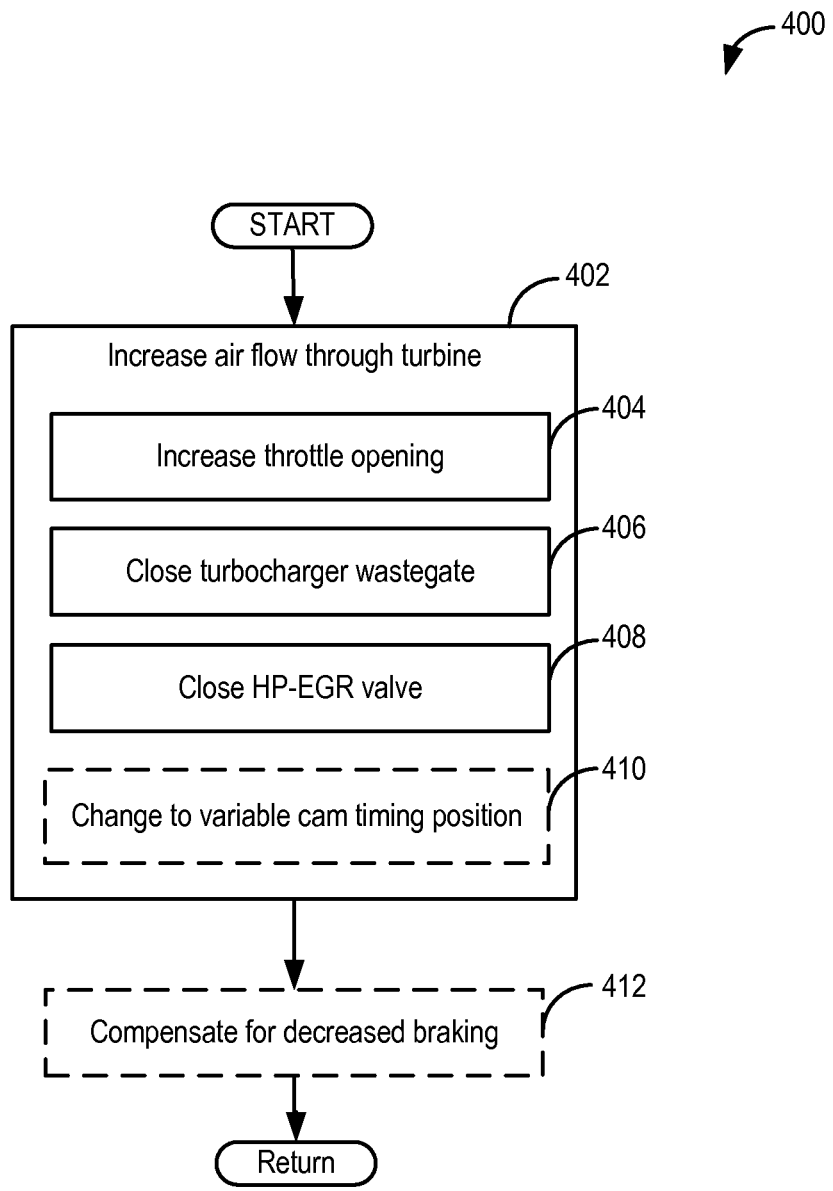
FIG. 4 shows a flowchart illustrating an example method for adjusting one or more actuators for increasing air flow through the turbine.
Figure 5:
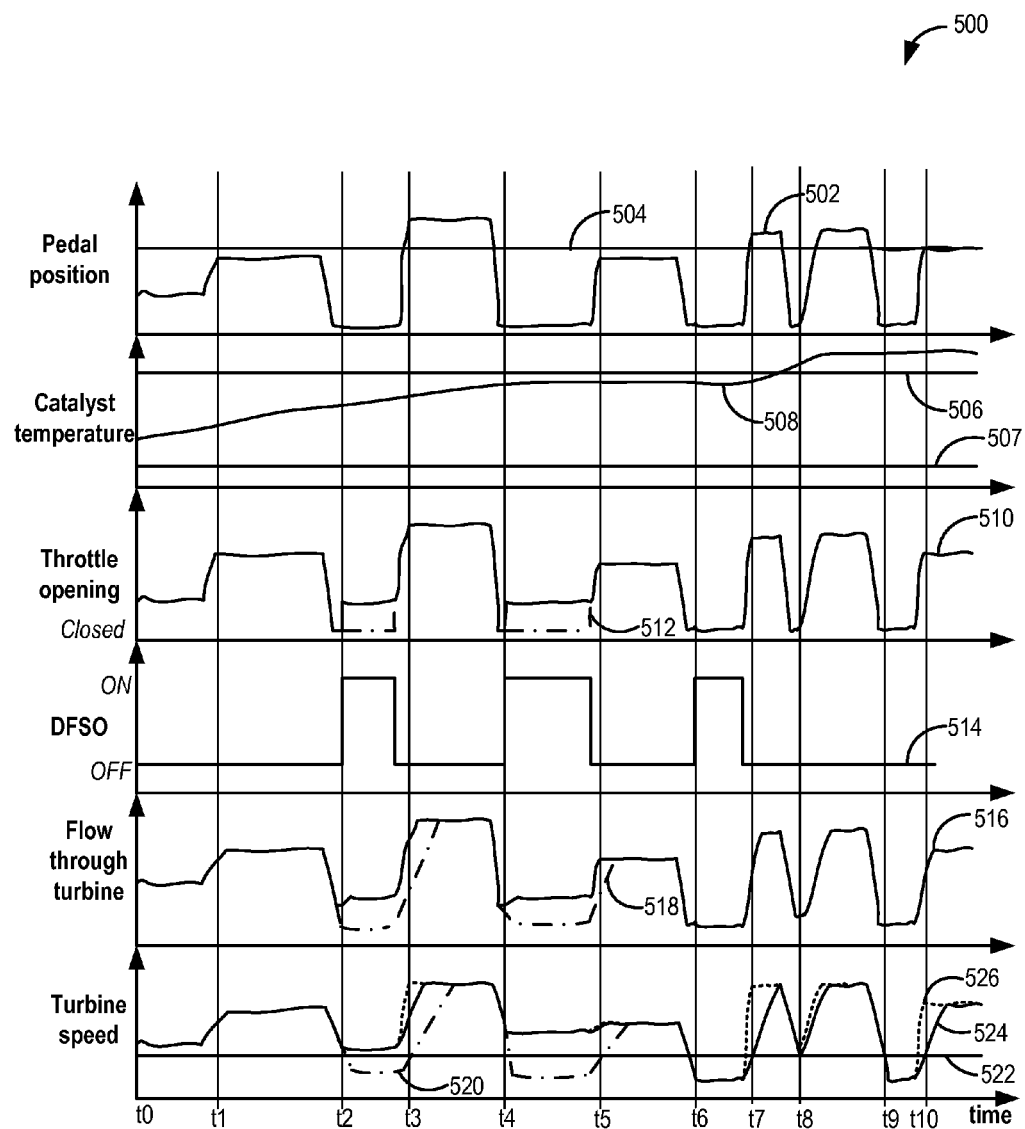
FIG. 5 shows an example adjustment of air flow through turbine based on vehicle operating conditions according to the present disclosure.

FIG. 4 is a flow chart illustrating an example method 400 for increasing air flow through the turbine. Method 400 may be performed in cooperation with method 300 at FIG. 3. As discussed above, air flow through turbine may be increased in order to increase turbine speed and maintain the turbine speed above a threshold during tip-out conditions so that during a subsequent tip-in, boost response in improved and turbo-lag is reduced.

At 402, method 400 includes increasing air flow through the turbine. Increasing air flow through the turbine may include, at 404, increasing an opening of an air intake throttle (e.g. throttle 21 at FIG. 2) via a throttle actuator. For example, position of a throttle plate of the throttle may be varied by the controller via a signal provided to an electric motor or actuator included with the throttle. In one example, the air intake throttle may be opened from a fully closed position to an open position, where an amount of opening may be adjusted based on turbine speed. For example, the intake throttle may be opened to a position so as to maintain the turbine speed above a threshold speed. That is, the intake throttle may be opened to a first amount until the turbine speed increases above a threshold and maintained at the first amount as long as the turbine speed is at or above the threshold. If the turbine speed decreases below the threshold speed, the intake throttle opening may be further increased to a second amount, where the second amount is greater than the first amount, to further increase air flow to the turbine and hence, increase turbine speed. In this way, intake throttle opening may be dynamically adjusted based on turbine speed in order to maintain turbine speed at or above the threshold speed during deceleration. In other examples, the air intake throttle may be opened to a fully open position (wide open throttle) to increase air flow through the turbine.

In some example systems including a second intake throttle (such as throttle 23 at FIG. 2); in addition to increasing the opening of the air intake throttle, the second intake throttle may be opened via a second throttle actuator coupled with the second throttle. In one example, the second intake throttle may be adjusted to a fully open position. In other examples, the second intake throttle may be adjusted based on the opening of the air intake throttle.

Increasing air flow through the turbine may further include, at 406, closing a turbocharger wastegate (such as wastegate 25 at FIG. 2). For example, position of the wastegate may be adjusted to a closed position via a signal provided to a wastegate actuator (such as actuator 150 at FIG. 2) coupled to the wastegate. By closing the turbocharger waste gate, a majority of the air flow from the cylinder may be directed to the turbine. In one example, increasing the intake throttle opening and closing the waste gate may be performed simultaneously.

Increasing air flow through the turbine may further include, at 408, closing a HP EGR valve. For example, a HP EGR actuator responsive to a control signal from a controller and coupled to the HP EGR valve may drive the HP EGR valve to a commanded valve position (e.g., closed). By closing the HP EGR valve, mass air flow from the cylinders to the turbine may be increased. In one example, increasing the intake throttle opening, closing the waste gate, and closing the HP EGR valve may be performed simultaneously.

Increasing air flow through the turbine may further include, at 410, adjusting a compressor bypass valve (CBV) such as CBV 27 at FIG. 2. For example, position of the CBV may be adjusted via a signal provided to a CBV actuator coupled to the CBV. In one example, the CBV may be adjusted based on the exhaust catalyst temperature. For example, when the exhaust catalyst temperature is between a lower threshold and a first upper threshold, the CBV may be maintained closed. Consequently, air may flow to the turbine via the compressor and the engine. However, when the exhaust catalyst temperature reaches the first upper threshold, the CBV may be opened and the air may flow to the turbine via the engine bypassing the compressor. The first upper threshold may be based on the maximum exhaust catalyst temperature before thermal degradation occurs, and may be lower than the upper exhaust catalyst temperature threshold discussed at FIG. 3. By bypassing the compressor, a temperature of the air delivered to the turbine may be reduced, which may prevent excess increase in exhaust catalyst temperature.

In some examples, in addition to adjusting the air intake throttle, closing the waste gate, and closing the high pressure EGR valve, engine may be operated with variable cam phasing. For example, an intake cam timing may be adjusted (e.g., advanced) to an optimal position for volumetric efficiency so that during a subsequent vehicle launch (e.g., tip-in) the cam timing is already at an optimal position, thereby reducing the lag associated with adjusting the cam timing during tip-in.

Upon increasing air flow through the turbine, method 400 may proceed to 412. At 412 method 400 includes adjusting one or more actuators (e.g., to increase wheel brake, increase alternator load, etc.) to compensate for decreased braking when air intake throttle is opened. For example when the air intake throttle is opened to increase air flow and fuel injection is shut-off, the vehicle may not get sufficient engine braking, and therefore a brake effort may need to be applied in order to maintain the desired deceleration rate typically present when there is closed throttle engine braking. Therefore, a vehicle control system may coordinate and adjust the braking efforts of alternate vehicle brakes (e.g., wheel brakes) to maintain a desired deceleration rate. In some examples, in embodiments where the engine or drive-train is coupled to an electric machine (e.g., in a hybrid electric vehicle) or any other hybrid-like device (hydraulic or pneumatic), the throttle opening may be coordinated with such devices (e.g., the devices could be operated in an energy or torque absorbing mode) to maintain the desired deceleration rate while keeping engine speed and air flow through the turbine.

It will be appreciated that the increasing air flow during the deceleration event may be adjusted based on vehicle operating conditions in response to resuming of engine cylinder fueling as discussed at FIG. 3. For example, in response to a sudden increase in torque demand (e.g., a tip-in, or the vehicle reaching an uphill segment), cylinder fueling may be resumed and the air intake throttle may be adjusted based on accelerator pedal position. Alternatively, if the turbine speed drops below a threshold speed during the deceleration (e.g., if the turbine speed was below a threshold during the previous operation prior to the tip-out), such that even by opening the throttle to wide open throttle conditions and adjusting the wastegate and the HP EGR valve, air flow to the turbine may not be sufficient to increase and maintain the turbine speed at the threshold speed, air flow to the turbine may be stopped. In some examples, based on a current turbine speed and a desired turbine speed during the deceleration fuel shut-off condition, an amount of air flow to maintain the turbine speed at or above the threshold may be estimated. If it is determined that the estimated air flow through turbine, hence desired turbine speed, may not be achieved, air flow through the turbine during deceleration fuel shut-off conditions may be terminated. However, fuel shut-off may be maintained until accelerator pedal is applied by the vehicle operator.

Turning to FIG. 5, an example map 500 illustrating example adjustments of air flow through turbine responsive to accelerator pedal position, catalyst temperature, and fuel injection is shown. The sequence of FIG. 5 may be provided by executing instructions in the system of FIGS. 1-2 according to the method of FIG. 3 in cooperation with the method of FIG. 4. Vertical markers at times t0-t5 represent times of interest during the sequence.

Specifically, the first plot from the top of FIG. 5 depicts accelerator pedal position versus time, and accelerator pedal is applied further in the direction of the Y axis arrow. Trace 502 depicts change in accelerator pedal position and horizontal line 504 depicts threshold accelerator pedal depression.

The second plot from the top of FIG. 5 depicts exhaust catalyst temperature versus time, and the catalyst temperature increases in the direction of Y axis arrow. Trace 508 depicts change in catalyst temperature, horizontal line 506 depicts upper catalyst temperature threshold, and horizontal line 507 depicts lower catalyst temperature threshold.

The third plot from the top of FIG. 5 depicts intake throttle opening versus time, and the throttle opening increases in the direction of Y axis arrow. Trace 510 depicts actual change in throttle opening to increase air flow through turbine during deceleration conditions according to the present disclosure, and trace 510 depicts change in throttle opening when air flow through turbine is not increased during deceleration conditions.

The fourth plot from the top of FIG. 5 depicts deceleration fuel shut-off conditions versus time. Trace 514 depicts a deceleration fuel shut-off ON or OFF condition.

The fifth plot from the top of FIG. 5 depicts flow through turbine versus time, and the flow through the turbine increases in the direction of Y axis arrow. Trace 516 depicts actual flow through the turbine when air flow through the turbine is increased during deceleration conditions in accordance with the present disclosure are implemented, and trace 518 depicts flow through turbine air flow through the turbine is not increased.

The sixth plot from the top of FIG. 5 depicts turbine speed versus time, and the turbine speed increases in the direction of Y axis arrow. Trace 524 depicts turbine speed when air flow is increased during deceleration conditions, trace 520 depicts turbine speed air flow is not increased during deceleration conditions, trace 526 depicts desired turbine speed, and horizontal line 522 depicts threshold turbine speed.

In all the plots, the X axis represents time and time increases from the left side of the plot to the right side of the plot.

At t0, the vehicle may be operating with boost and the exhaust catalyst temperature may be within the upper (506) and the lower threshold (507) range. Further, the throttle position (510) and hence, flow through the turbine (516) may be adjusted based on accelerator pedal position (502) to provide driver demanded torque.

Just prior to t1, the vehicle operator may request more torque by further applying the accelerator pedal (tip-in). In response to the tip-in, intake throttle opening may increase based on accelerator pedal position, and flow through the turbine may increase (516). Consequently, turbine speed (524) may increase. The vehicle operator may maintain tip-in operation for a duration greater than a threshold duration until just before t2 when the operator may release the accelerator pedal (502). In response to releasing the accelerator pedal, the intake throttle opening may decrease (510) and at t2, the intake throttle opening may be closed. Consequently, the flow through turbine may decrease (516) and the turbine speed (524) may decrease. Further, in response to vehicle operating in the tip-out conditions for a threshold duration, a deceleration fuel shut-off (514) event may be initiated at t2. Further, at t2, the exhaust catalyst temperature (506) may be within the threshold range. Thus, at t2, in response to the tip-out following the vehicle operating in tip-in conditions for the threshold duration, fuel shut-off conditions, and exhaust catalyst temperature remaining within threshold range, air flow through the turbine may be increased in order to increase turbine speed and maintain turbine speed at or above the threshold speed (522). Air flow through the turbine may be increased by increasing the intake throttle opening. In some examples, additionally a wastegate may be closed to increase flow through the turbine. In some other examples, additionally or alternatively a compressor by pass valve may be closed. In still further examples, increasing flow through the turbine may be accomplished by adjusting one or more actuators including variable cam timing. In yet another example, in systems including a HP EGR valve, the HP EGR valve may be closed. Details of increasing air flow through the turbine during deceleration conditions are described above at FIG. 4.

In this way, by increasing flow through the turbine, turbine speed may be maintained above a threshold so that during a subsequent request for boost (that is, during a subsequent tip-in following the tip-out), the boost response may be improved. In other words, during a subsequent tip-in following the tip-out, a duration to reach a desired turbine speed may be reduced, thereby reducing turbo lag. Further, by increasing flow during fuel shut-off conditions, unwanted acceleration may be reduced. Consequently, additional measures to increase engine braking (e.g., spark retard) may be reduced. Still further, by increasing flow only when the exhaust catalyst is within the threshold range, thermal damage to the exhaust catalyst may be reduced.

As such, air flow through the turbine may be continued until the accelerator pedal is applied and/or until the exhaust catalyst temperature reaches the upper threshold. Thus, air flow through the turbine during deceleration fuel shut-off may be continued from t2 until just before t3 when a tip-in to high throttle input may be initiated by the vehicle operator by applying the accelerator pedal. In response to tip-in, just before t3, fuel injection may be resumed, and throttle opening may be adjusted based on accelerator pedal input. Further, one or more actuators that were utilized to increase air flow through turbine during the tip-out may be adjusted based on current operating conditions. For example, one or more actuators including the wastegate actuator, the CBV actuator, the HP EGR valve actuator, and variable camshaft timing actuator may be adjusted based on current operating conditions so as to provide driver demanded torque. Further, due to increasing air flow through the turbine during the deceleration conditions (between t2 and up to just before t3) before the tip-in a duration to reach a desired turbine speed in response to tip-in is reduced, thereby reducing turbo lag. Thus boost response is improved. Said another way, a current rate of change of turbine speed is closer to the desired rate of change of turbine speed when air flow through turbine is increased compared to a rate of change of turbine speed when air flow through turbine is not increased.

Between t3 and t4, the vehicle operator may maintain high accelerator pedal input (502). Just prior to t4, the vehicle operator may initiate a tip-out operation to closed throttle conditions. In response to the tip-out just prior to t4, at t4, fuel may be shut-off to the engine (514). Further, the exhaust catalyst temperature may be within the threshold range (508). In response to the tip-out following the tip-in to high throttle input (that is tip-out following a tip-in with accelerator pedal depression greater than a threshold), the exhaust catalyst temperature remaining within the threshold range and the fuel shut-off to the engine, flow to the turbine may be increased (516). As shown in this example, flow to the turbine may be increased by opening the intake throttle when the accelerator pedal is released (tip-out). Throttle position when air flow through the turbine is not increased is shown at 512. Additionally or alternatively, one or more actuators may be adjusted to increase flow through the turbine as discussed above with respect to FIG. 4. The one or more actuators that may be adjusted include the wastegate actuator to adjust the wastegate position, the CBV actuator to adjust the CBV position, the HP EGR valve actuator to adjust the HP EGR valve position, and camshaft timing actuator. For example, in order to increase flow through the turbine, the waste gate may be closed.

In some examples, if the turbine speed decreases below the threshold, flow through the turbine during deceleration fuel shut-off conditions may be terminated.

The air flow to turbine may be continued until just before t5 when the driver initiates a tip-in event (502). In response to the tip-in event, fuel injection to the engine may be resumed (514); the air flow to the turbine may be adjusted based on current vehicle operating conditions to provide the driver demanded torque. For example, intake throttle opening may be adjusted responsive to the accelerator pedal input to provide driver demanded torque. Since air flow to the turbine was increased during the tip-out (between t4 and t5) to maintain the turbine speed at or above the threshold prior to the tip-in (just before t5), duration to reach a desired turbine speed may be reduced. Thus, boost response is improved and turbo lag is reduced. Further, the tip-in event initiated just prior to t5 may result in an accelerator pedal input below the threshold (that is, accelerator pedal depression may be below the threshold) and the tip-in event may occur for a duration less than the threshold until just before t6 when the vehicle operator may initiate a tip-out to closed throttle conditions. In response to the tip-out, at t6, a deceleration fuel shut-off event may be initiated. Further, at t6, the exhaust catalyst temperature may continue to remain within the threshold range. However, at t6, due to the previous tip-in event (between t5 and t6 prior to the tip-out) being below a threshold duration and below a threshold input, turbine speed may be below the threshold. Consequently, any increase in air flow through turbine during the deceleration may not be sufficient to maintain turbine speed above a threshold. Accordingly, air flow increase through the turbine may not be initiated at t6 (that is, air intake throttle may not be opened) and the engine may operate with fuel shut-off and without increasing air flow through turbine (516).

Next, just prior to t7, the vehicle operator may initiate a tip-in, where the tip-in displacement is greater than a threshold displacement (that is, amount of accelerator pedal input is greater than a threshold). In response to the tip-in, fuel injection may be resumed and the turbine speed begins to increase. However, the vehicle may experience turbo-lag, that is, a delay in boost response (524). At a time just prior to t8, the vehicle operator may initiate a tip-out. In response to the tip-out, at t8, the throttle opening decreases to a closed position. Further, a duration of tip-out may be less than a threshold. Therefore, DFSO may not be performed. Consequently, operations to increase air flow through the engine may not be performed. Thus, airflow to the turbine may not be increased. Immediately after t8, the vehicle operator may initiate another tip-in. Further, between t8 and t9, the exhaust catalyst temperature may increase above the threshold. When the exhaust catalyst temperatures are greater than the threshold, operations to increase air flow through the turbine during the deceleration may not be performed. Therefore, at t9, in response to a tip-out, due to the catalyst temperature being greater than the threshold, air flow through the turbine may not be increased.

In this way by increasing air flow through the turbine during deceleration conditions that occur after vehicle operation with long and/or large accelerator pedal input, when fuel is shut-off and when the exhaust catalyst temperature is within a threshold range, turbine speed may be increased and maintained at or above a threshold speed. Consequently, the technical effect of reducing a duration to increase the turbine speed to a desired speed is reduced during a subsequent tip-in. As a result, boost response and fuel economy are improved without incurring thermal damage to the exhaust catalyst.

In one example, the methods of FIGS. 3 and 4, and the sequence of FIG. 5 may enable a method for a boosted engine, comprising: in response to a deceleration event, deactivating fuel injectors to all cylinders of the engine while increasing airflow through a turbine of a turbocharger when a temperature of an exhaust catalyst downstream of the turbine is between a upper threshold and a lower threshold. The method includes wherein the deceleration event is initiated subsequent to a tip-in event. The method further includes wherein during the tip-in event, an amount of accelerator pedal depression is greater than a threshold amount; and wherein increasing air flow through the turbine includes increasing an opening of an air intake throttle positioned in the air intake passage of the engine upstream of a compressor of the turbocharger. The method includes wherein an amount of opening of the air intake throttle is based on a desired turbine speed; and wherein increasing air flow through the turbine further includes closing a turbine wastegate and closing a high pressure EGR valve. The method further comprises: during the deceleration event, stopping the air flow through the turbine responsive to the temperature increasing above upper threshold while maintaining deactivation of the fuel injectors; wherein stopping the air flow through the turbine includes closing the air intake throttle. The method further comprises: in response to detecting accelerator pedal application, adjusting air flow through the turbine and activating one or more of the deactivated fuel injectors, the adjusting and the activation based on a current engine load demand. The method further includes wherein the deceleration event is a tip-out to a closed air intake throttle condition.

In another example, the methods of FIGS. 3 and 4, and the sequence of FIG. 5 may enable a method for an engine, comprising: in response to a deceleration fuel shut-off event, when a temperature of an exhaust catalyst is between a upper threshold and a lower threshold, maintaining a turbine speed of a turbocharger above a threshold speed; wherein the deceleration fuel shut-off event occurs responsive to a tip-out after a tip-in to a wide open throttle condition; wherein maintaining the turbine speed includes increasing air flow through the turbine during the deceleration fuel shut-off event; and wherein increasing air flow through the turbine includes closing a wastegate coupled across the turbine, closing a high pressure EGR valve, and increasing an opening of an air intake throttle positioned in the air intake passage of the engine upstream of a compressor of the turbocharger. The method further comprises: during the deceleration fuel shut-off event, stopping the air flow through the turbine responsive to the exhaust catalyst temperature increasing above an upper threshold temperature, the stopping including closing the air intake throttle. The method further comprises: in response to detecting application of an accelerator pedal, terminating the deceleration fuel shut-off event and adjusting air flow through the turbine based on a current engine load demand; and wherein terminating the deceleration fuel shut-off event includes activating one or more fuel injectors based on the current engine load demand. The method further comprises: opening a compressor bypass valve coupled across the compressor responsive to the exhaust catalyst temperature reaching a second threshold, the second threshold lesser than the upper threshold and greater than the lower threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
in response to determining, with an engine controller, a deceleration event, and with the engine controller: deactivating fuel injectors to all cylinders of the engine while increasing airflow through a turbine of a turbocharger in response to a temperature of an exhaust catalyst downstream of the turbine determined to be between an upper threshold and a lower threshold.

2. The method of claim 1, wherein the deceleration event is initiated subsequent to a tip-in event.

3. The method of claim 2, wherein during the tip-in event, an amount of accelerator pedal depression is greater than a threshold amount.

4. The method of claim 2, wherein the deceleration event is a tip-out to a closed air intake throttle condition.

5. The method of claim 1, wherein increasing airflow through the turbine includes increasing an opening of an air intake throttle positioned in an air intake passage of the engine upstream of a compressor of the turbocharger.

6. The method of claim 5, wherein an amount of opening of the air intake throttle is based on a turbine speed.

7. The method of claim 6, wherein increasing air flow through the turbine further includes closing a turbine wastegate and closing a high pressure exhaust gas recirculation valve.

8. The method of claim 1, further comprising, during the deceleration event, stopping the airflow through the turbine responsive to the temperature increasing above the upper threshold while maintaining deactivation of the fuel injectors.

9. The method of claim 8, wherein stopping the airflow through the turbine includes closing an air intake throttle.

10. The method of claim 1, further comprising, in response to detecting accelerator pedal application, adjusting airflow through the turbine and activating one or more of the deactivated fuel injectors, the adjusting and the activation based on a current engine load demand.

11. A method for an engine, comprising:
in response to determining, with an engine controller, a deceleration fuel shut-off event, when a temperature of an exhaust catalyst, determined with the engine controller, is between an upper threshold and a lower threshold, maintaining a turbine speed of a turbocharger above a threshold speed.

12. The method of claim 11, wherein the deceleration fuel shut-off event occurs responsive to a tip-out after a tip-in to a wide open throttle condition.

13. The method of claim 12, wherein maintaining the turbine speed includes increasing air flow through a turbine, with the engine controller, during the deceleration fuel shut-off event.

14. The method of claim 13, wherein increasing air flow through the turbine includes closing a wastegate coupled across the turbine, closing a high pressure exhaust gas recirculation valve, and increasing an opening of an air intake throttle positioned within an air intake passage of the engine upstream of a compressor of the turbocharger.

15. The method of claim 14, further comprising, during the deceleration fuel shut-off event, stopping the air flow through the turbine responsive to the exhaust catalyst temperature increasing above the upper threshold, the stopping including closing the air intake throttle.

16. The method of claim 15, further comprising, in response to detecting application of an accelerator pedal, terminating the deceleration fuel shut-off event and adjusting air flow through the turbine based on a current engine load demand; and wherein terminating the deceleration fuel shut-off event includes activating one or more fuel injectors based on the current engine load demand.

17. The method of claim 14, further comprising opening a compressor bypass valve coupled across the compressor responsive to the exhaust catalyst temperature reaching a second threshold; wherein the second threshold is less than the upper threshold and greater than the lower threshold.

18. A turbocharged engine system, comprising:
an engine including a plurality of cylinders, an intake manifold and an exhaust manifold;
a compressor coupled to the intake manifold and driven by a turbine coupled to the exhaust manifold;
an air intake throttle positioned within an intake passage upstream of the compressor, the intake passage coupling the compressor with ambient air;
an exhaust catalyst coupled within an exhaust passage downstream of the turbine, the exhaust passage coupling the catalyst with ambient air;
each of the plurality of cylinders having one fuel injector for injecting fuel to the cylinder;
an accelerator pedal for receiving an operator torque request; and
a controller having executable instructions stored in a non-transitory memory for:
in response to an accelerator pedal tip-out event initiated subsequent to a tip-in event, deactivating all fuel injectors;
during a first condition, flowing air from the ambient to the turbine via the compressor and the engine while maintaining deactivation of the fuel injectors;
during a second condition, flowing air from the ambient to the turbine via the engine by passing the compressor while maintaining deactivation of the fuel injectors; and
during a third condition, stopping flowing air to the turbine while maintaining deactivation of the fuel injectors;
wherein the first condition includes an exhaust catalyst temperature between a lower threshold and a first upper threshold;
wherein the second condition includes the exhaust catalyst temperature at or above the first upper threshold and below a second upper threshold, the second upper threshold greater than the first upper threshold; and
wherein the third condition includes the exhaust catalyst temperature at or above the second upper threshold.

19. The system of claim 18, wherein flowing air to the turbine includes increasing an opening of the air intake throttle based on a desired turbine speed.

20. The system of claim 19, wherein the controller includes further instructions for: in response to application of the accelerator pedal subsequent to the tip-out event, activating one or more fuel injectors and adjusting flow through the turbine based on an operator torque demand.

* * * * *